United States Patent
Sagara

(10) Patent No.: US 8,531,927 B2
(45) Date of Patent: Sep. 10, 2013

(54) OPTICAL DISC APPARATUS, TILT CORRECTION METHOD, AND PROGRAM

(75) Inventor: Seiichi Sagara, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/495,188

(22) Filed: Jun. 13, 2012

(65) Prior Publication Data

US 2012/0320722 A1 Dec. 20, 2012

(30) Foreign Application Priority Data

Jun. 20, 2011 (JP) ................................. 2011-135912

(51) Int. Cl.
*G11B 7/00* (2006.01)
(52) U.S. Cl.
USPC ...................... 369/44.32; 369/53.19
(58) Field of Classification Search
None
See application file for complete search history.

(56) References Cited

U.S. PATENT DOCUMENTS 7,307,929 B2    12/2007  Ohno
2009/0109811 A1*  4/2009  Tomita et al. ............... 369/44.32

FOREIGN PATENT DOCUMENTS

JP    2004-234783 A    8/2004

* cited by examiner

*Primary Examiner* — Wayne Young
*Assistant Examiner* — Brian Butcher
(74) *Attorney, Agent, or Firm* — Lerner, David, Littenberg, Krumholz & Mentlik, LLP

(57) ABSTRACT

An optical disc apparatus includes: a light irradiation/reception section to irradiate an optical disc recording medium with light via an objective lens and receive return light of the light; a tilt adjustment section to tilt the lens; a focus servo control section to exert focus servo control over the lens; a focus bias application section to apply a focus bias to a focus servo loop; a tracking direction error signal generation section to generate a tracking direction error signal representing an error between light-reception signals; and a control section to perform a tilt adjustment value search process for making a search for a tilt adjustment value with which the tracking direction error signal is maximized, a tilt adjustment value revision process for revising the tilt adjustment value found by the tilt adjustment value search process, and an adjustment control process for causing the tilt adjustment section to perform tilt adjustment.

10 Claims, 13 Drawing Sheets

FIG.3A
FIG.3B
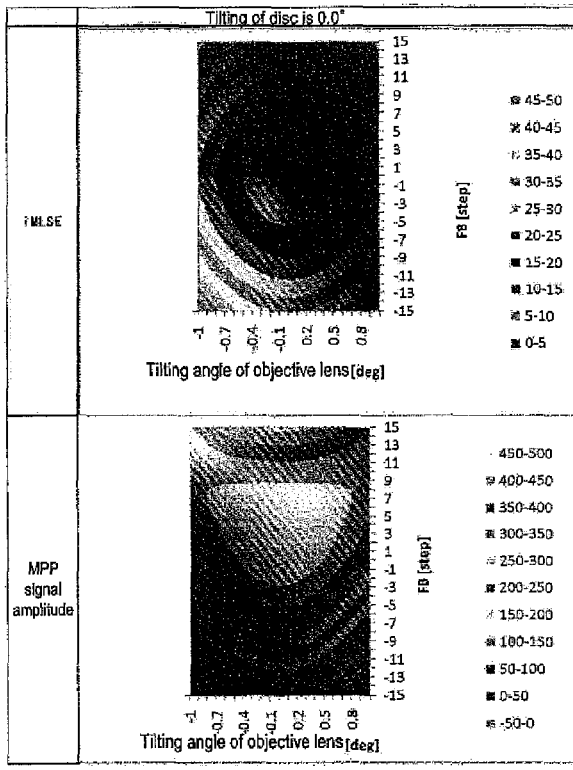
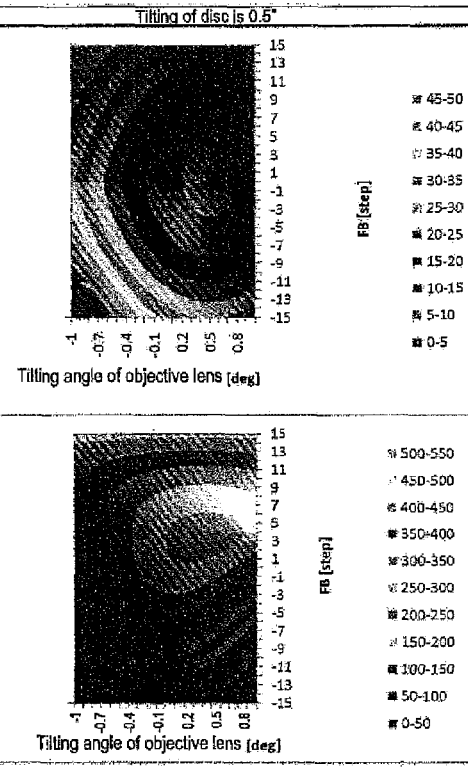
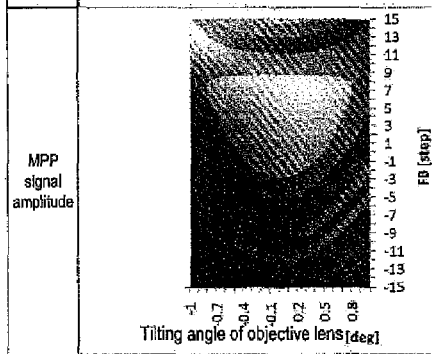
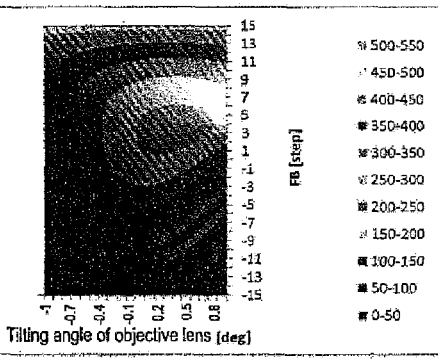
FIG.3C
FIG.3D

OPTICAL DISC APPARATUS, TILT CORRECTION METHOD, AND PROGRAM

CROSS-REFERENCE TO RELATED APPLICATION

The present application claims priority from Japanese Patent Application No. JP 2011-135912 filed in the Japanese Patent Office on Jun. 20, 2011, the entire content of which is incorporated herein by reference.

BACKGROUND

The present technology relates to an optical disc apparatus for recording/reproduction on/from an optical disc recording medium, a tilt correction method for the optical disc apparatus, and a program for running in the optical disc apparatus.

Optical disc recording media (hereinafter, referred to also as optical discs) have been widely available, e.g., CDs (Compact Discs), DVDs (Digital Versatile Discs), and BDs (Blu-ray Discs™)

Such optical discs are subjected to recording and reproduction by an optical disc apparatuses, which is sometimes provided with a function of tilt correction. With the tilt correction function, angular deviation (tilt) of laser light from the optical axis entering the recording surface of an optical disc is corrected. This is to prevent the servo and recording/reproduction performances from being impaired by coma aberration to be caused by the tilt.

Such tilt occurs mainly due to warping of the optical discs, i.e., disc tilt. The optical disc apparatus corrects such disc tilt generally by tilting an objective lens, i.e., by tilting the optical axis of the objective lens through which laser light passes.

For such tilt correction, the objective lens is actually tilted differently for signal detection at a plurality of tilt positions, and based on the results thereof, a correction value considered optimal (tilt adjustment value) is found, i.e., a search is made for an optimal tilt adjustment value.

In other words, by using the search result of an optimal tilt adjustment value found as such as a basis for tilt correction, the tilt correction is made appropriately to the combination of an optical pickup and an optical disc actually in use.

With such tilt correction, if with a ROM (Read-Only Memory) disc specifically for reproduction use, for example, an estimation value based on a reproduced signal may be used as an estimation indicator during the search for the optimal tilt adjustment value as above.

However, if with a recordable disc, e.g., a not-yet-recorded disc (blank disc) or a partially-recorded disc, such an estimation indicator based on the reproduced signal may not be used during the search.

Therefore, for the search for an optimal tilt adjustment value when a recordable disc is in use, the estimation indicator for use is the amplitude of a push-pull signal or that of a tracking error signal (for example, see Japanese Patent Application Laid-open No. 2004-234783 (hereinafter, referred to as Patent Document 1)).

The issue here is that, in comparison with a case of using the estimation indicator based on the reproduced signal, when the estimation indicator in use is the amplitude of the push-pull signal or that of the tracking error signal, the accuracy of the search for the optimal tilt adjustment value seems to be reduced.

In consideration thereof, Patent Document 1 referred above describes the technique for improving the accuracy of the search for a tilt adjustment value using the amplitude of a push-pull signal or that of a tracking error signal.

To be specific, in Patent Document 1, two types of search are made for an optimal tilt adjustment value; one is with an estimation value based on a reproduced signal using any recorded section, and the other is with the amplitude of a push-pull signal. The results of such searches are tilt correction values (S1 and S2), and a difference therebetween ($\Delta S$) is calculated beforehand. Thereafter, a search for an optimal tilt adjustment value using the amplitude of the push-pull signal is made again this time at a recording-start position (not-yet-recorded region). The resulting tilt adjustment value (S3) is revised using the difference, and based on the resulting tilt adjustment value revised as such, tilt correction is performed.

SUMMARY

The issue here is that the previous approach described in Patent Document 1 gives no consideration to a focus bias value, which is set at the time of the search for the tilt adjustment value.

The amplitude of the push-pull signal shows the change characteristics with respect to the tilt adjustment value (the degree of tilt of an objective lens) that vary by the focus bias value set for the search. This is because, when the objective lens is tilted, the tilt causes aberration other than coma aberration (e.g., especially astigmatic aberration) based on the degree of the tilt.

As such, with the previous approach, when a focus bias value at the time of the calculation of the difference $\Delta S$ is greatly different from a focus bias value at the time of the search for the optimal tilt adjustment value at the recording-start position, even if the tilt correction values found at the recording-start position are provided with the difference $\Delta S$, the resulting tilt correction is not performed with good accuracy.

In view of the problems as described above, it is thus desirable to improve the accuracy of tilt correction in a not-yet-recorded region.

According to an embodiment of the present technology, an optical disc apparatus is configured as below.

That is, the optical disc apparatus according to the embodiment of the present technology is provided with a light irradiation/reception section configured to irradiate an optical disc recording medium with laser light via an objective lens, and to receive return light of the laser light from the optical disc recording medium via the objective lens.

Also provided is a tilt adjustment section configured to tilt the objective lens.

Also provided is a focus servo control section configured to exert focus servo control over the objective lens based on a light-reception signal obtained by the light irradiation/reception section receiving the return light.

Also provided is a focus bias application section configured to apply a focus bias to a focus servo loop formed as a result of the focus servo control by the focus servo control section.

Also provided is a tracking direction error signal generation section configured to generate, based on the light-reception signals obtained by the light irradiation/reception section performing splitting-light reception in a tracking direction, a tracking direction error signal representing an error between the light-reception signals.

Also provided is a control section configured to perform a tilt adjustment value search process, a tilt adjustment value revision process, and an adjustment control process. The tilt adjustment value search process is for making a search for, based on the tracking direction error signals as a result of setting various tilt adjustment values to the tilt adjustment section, a tilt adjustment value with which the tracking direction error signal is maximized. The tilt adjustment value revision process is for revising the tilt adjustment value found by the tilt adjustment value search process based on difference information representing a difference between a tilt adjustment value with which a signal quality estimation value is maximized, and the tilt adjustment value with which the tracking direction error signal is maximized, the signal quality estimation value being generated based on the reproduced signal of a signal recorded on the optical disc recording medium, the difference information being calculated in advance under the condition of using a focus bias value found by a search/setting method same as a search/setting method for a focus bias value to be set to the focus bias application section when the tilt adjustment value search process is performed. The adjustment control process is for causing the tilt adjustment section to perform tilt adjustment based on the tilt adjustment value obtained by the tilt adjustment value revision process.

As such, with the embodiment of the present technology, the difference information (information about a difference between the tilt adjustment value with which the signal quality estimation value is maximized, and the tilt adjustment value with which the amplitude of the tracking direction error signal is maximized) is used for revising the tilt adjustment value found by the search (tilt adjustment value search process) for the tilt adjustment value with which the tracking direction error signal is maximized. Such difference information is calculated in advance under the condition of using the focus bias value searched for and set by the search/setting method therefor for setting for the tilt adjustment value search process.

Unlike with the previous approach, this accordingly prevents the two focus bias values from being greatly different from each other, i.e., the focus bias value to be set for the tilt adjustment value search process, and the focus bias value to be set for calculating the difference (ΔS).

This thus improves the accuracy of tilt correction to be made in a not-yet-recorded region using a tracking direction error signal better than with the previous approach.

According to the embodiment of the present technology, tilt correction in a not-yet-recorded region is performed with better accuracy than the previous approach.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 3A to 3D are each a contour map representing the change characteristics of the amplitude of an MPP signal (and the change characteristics of iMLSE) with respect to a focus bias value and the tilt angle of an objective lens;

DETAILED DESCRIPTION OF EMBODIMENTS

Hereinafter, embodiments of the present technology will be described with reference to the drawings.

Note that the description is given in the following order.
[1. First Embodiment]
 (1-1. Exemplary Configuration of Optical Disc Apparatus)
 (1-2. Relationship between Search for Optimal Tilt Adjustment Value and Focus Bias)
 (1-3. Tilt Correction Method as First Embodiment)
 (1-4. Procedure)
[2. Second Embodiment]
 (2-1. Exemplary Configuration of Optical Disc Apparatus)
 (2-2. Tilt Correction Method as Second Embodiment)
 (2-3. Procedure)
[3. Modifications]
 (3-1. Modification of First Embodiment)
 (3-2. Modification of Second Embodiment)
 (3-3. Others)

1. First Embodiment (1-1. Exemplary Configuration of Optical Disc Apparatus)

Figure 1:
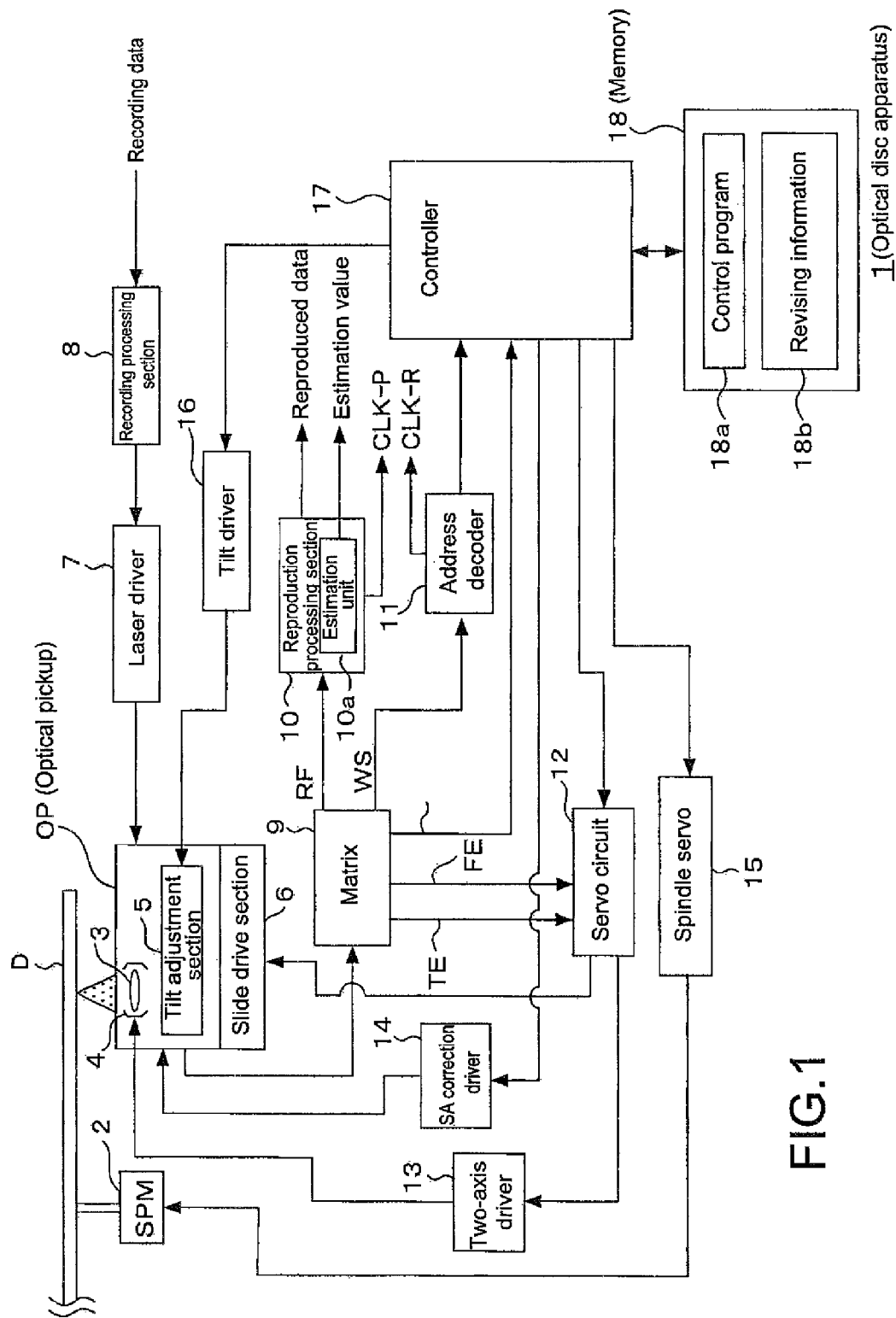
FIG. 1 is a diagram showing the internal configuration of an optical disc apparatus as a first embodiment.

FIG. 1 shows the internal configuration of an optical disc apparatus (referred to as optical disc apparatus 1) as a first embodiment of the present technology.

First of all, an optical disc D in the drawing is a disc-shaped optical recording medium (optical disc recording medium). Herein, the optical recording medium denotes a recording medium on/from which information is recorded/reproduced by irradiation of light.

The optical disc apparatus 1 in this embodiment is assumed to be able to record/reproduce information on/from the optical disc D at least being a DVD (Digital Versatile Disc) or a BD (Blu-ray Disc™)

When the optical disc D is loaded into the optical disc apparatus 1, a spindle motor (SPM) 2 in the drawing drives the optical disc D to rotate.

The spindle motor 2 drives the optical disc D to rotate in accordance with a drive signal coming from a spindle servo circuit 15 that will be described later.

The optical disc apparatus 1 is provided with an optical pickup OP, which irradiates the optical disc D driven to rotate as described above with laser light for information recording/reproduction thereon/therefrom, and receives reflected light (return light) of the laser light after irradiation to the optical disc D.

The optical pickup OP is provided therein with a laser diode from which the laser light comes. The optical pickup OP is also provided with an objective lens 3, and a two-axis actuator 4. The objective lens 3 gathers the laser light to the optical disc D, and the two-axis actuator 4 keeps hold of the objective lens 3 to move it in the direction toward or away from the optical disc D, i.e., focus direction, and in the radius direction, i.e., tracking direction. The optical pickup OP is also provided with a light reception section including photodetectors for receiving the reflected light described above. The optical pickup OP also include therein an optical system for directing the laser light from the laser diode to the objective lens, and for directing the reflected light to the photodetectors.

The optical pickup OP is also provided therein with a tilt adjustment section 5 in charge of tilt adjustment. This tilt adjustment section 5 is so configured as to tilt the objective lens 3, thereby adjusting the tilt being the angular deviation of the laser light from the optical axis entering the recording surface of the optical disc D.

Although not shown, in the optical pickup OP, a spherical aberration correction mechanism is provided for correction of spherical aberration (SA). By the spherical aberration correction mechanism being driven by an SA correction driver 14 that will be described later, the laser light applied to the optical disc D via the objective lens 3 is subjected to the spherical aberration correction.

Such an optical pickup OP is held in its entirety by a slide drive section 6 in the drawing to be able to slide in the tracking direction.

The laser diode in the optical pickup OP is driven to emit light by a laser driver 7. During recording, the laser driver 7 drives the laser diode to emit light in accordance with a recording signal provided by a recording processing section 8.

The recording processing section 8 generates the recording signal by performing predetermined recording modulation and coding or others to any provided recording data.

A matrix circuit 9 is provided with a light-reception signal, which is obtained by the light reception section in the optical pickup OP receiving the reflected light.

The matrix circuit 9 is provided with a current-voltage conversion circuit to be ready for an output current from a plurality of light-receiving elements each being the photodetector, a matrix operation/amplification circuit, and others, and generates any signals by matrix operation for later use.

The signals to be generated by the matrix circuit 9 include a radio-frequency signal for obtaining reproduced data (reproduced data signal: hereinafter, referred to as RF signal), a focus error signal FE for servo control, and a tracking error signal TE.

Herein, the focus error signal FE represents a focus position error of the laser light entering the recording surface (reflection surface) of the optical disc D. The tracking error signal TE represents a position error of the laser light in the tracking direction at irradiation spots on tracks (series of pits or grooves) formed to the recording surface. In this embodiment, for use as the tracking error signal TE, a tracking error signal (during recording) is generated by DPP (Differential Push Pull), or a tracking error signal (during reproduction) is generated by DPD (Differential Phase Detection). As is well known, the tracking error signal generated by the DPP is based on an MPP (Main Push Pull) signal, and an SPP (Side Push Pull) signal.

The matrix circuit 9 generates a signal associated with wobbling of the grooves, that is, a wobble signal WS for use to detect any wobbling.

The RF signal generated by the matrix circuit 9 is provided to a reproduction processing section 10, the focus error signal FE and the tracking error signal TE are to a servo circuit 12, and the wobble signal WS is to an address decoder 11.

The MPP signal generated by the matrix circuit 9 is provided to a controller 17.

The reproduction processing section 10 performs binary processing to the RF signal, and also performs processing for recovery clock generation by a PLL (Phase Locked Loop).

The processing result by the reproduction processing section 10, i.e., reproduced data (binary data), is provided to a demodulation circuit that is not shown, and then is subjected to error correction processing, for example.

Hereinafter, the clock recovered by the reproduction processing section 10 is denoted as CLK-P.

The reproduction processing section 10 is provided with an estimation unit 10a.

As to the binary data as a result of the binary processing to the RF signal, the estimation unit 10a measures (calculates) an estimation value serving as the estimation indicator about the reproduction performance thereof (about the quality of the reproduced signal). In this embodiment, the estimation unit 10a generates iMLSE (Maximum Likelihood Sequence Estimation) for use as the estimation value.

The estimation value generated by the estimation unit 10a is provided to any components asking therefor including the controller 17.

The address decoder 11 uses the wobble signal WS as a basis to perform detection of address information recorded by the wobbling of the grooves. The detected address information is provided to the controller 17.

The address decoder 11 generates a clock CLK-R by PLL processing using the wobble signal WS. This clock CLK-R is used as an encode clock during recording, for example.

The servo circuit 12 implements the servo operation by generating servo signals varying in type of focus, tracking, and thread based on the signals from the matrix circuit 9, i.e., the focus error signal FE, and the tracking error signal TE. In other words, the servo circuit 12 generates a focus servo signal and a tracking servo signal respectively based on the focus error signal FE and the tracking error signal TE. The signals generated as such are provided to a two-axis driver 13.

The two-axis driver 13 drives a focus coil and a tracking coil in the two-axis actuator 4 respectively by a focus drive signal and a tracking drive signal, which are generated respectively based on the focus servo signal and the tracking servo signal. As such, two types of loops, i.e., a focus servo loop and a tracking servo loop, are formed by the components including the two-axis actuator 4, the matrix circuit 9, the servo circuit 12, and the two-axis driver 13.

The servo circuit 12 also drives the slide drive section 6 by generating a slide drive signal based on a slide error signal or the access control by the controller 17, for example. The slide error signal is the one obtained as a low-frequency component of the tracking error signal TE. Although not shown, the slide drive section 6 is provided with a mechanism including a main shaft to keep hold of the optical pickup OP, a slide motor, a transmission gear, and others. The slide drive section 6 as such drives the slide motor in accordance with the slide drive signal, thereby moving the optical pickup OP to slide as predetermined.

The servo circuit 12 is so configured as to be able to apply a focus bias to the focus servo loop. To be specific, the servo circuit 12 is provided therein with an adder for an addition of a focus bias value to the focus error signal FE coming from the matrix circuit 9.

The focus bias value for the addition by the servo circuit 12 is designated by the controller 17.

A spindle servo circuit 15 exerts control over the spindle motor 2 to put it in CLV rotation (rotation with constant linear velocity).

The spindle servo circuit 15 generates a spindle error signal by making a comparison between information about the current rotation speed of the spindle motor 2 and information about a predetermined CLV reference speed. The rotation speed information herein is the clock CLK-R generated by the PLL processing that is performed by the above-described address decoder 11 to the wobble signal WS.

At the time of data reproduction, the information about the current rotation speed of the spindle motor 2 is the clock CLK-P, which is generated by the PLL processing by the reproduction processing section 10. Therefore, also by making a comparison between this rotation speed information and the predetermined CLV reference speed information, a spindle error signal is to be generated.

The spindle servo circuit 15 then outputs a spindle drive signal generated in accordance with the spindle error signal, thereby implementing the CLV rotation of the spindle motor 2.

The spindle servo circuit 15 also puts the spindle motor 2 into operations of activation, stop, acceleration, and deceleration by another spindle drive signal generated in accordance with a spindle kick/brake control signal coming from the controller 17.

The SA correction driver 14 drives the spherical aberration correction mechanism in the optical pickup OP based on a spherical aberration correction value designated by the controller 17.

The optical disc apparatus 1 is also provided with a tilt driver 16.

The tilt driver 16 provides a drive signal to the tilt adjustment section 5 described above for adjusting the degree of tilt of the objective lens 3 so that the tilt adjustment section 5 performs tilt adjustment. As to the degree of tilt (tilt adjustment value) of the objective lens 3, the controller 17 designates it to the tilt driver 16.

The servo- and recording/reproduction-related components described above are controlled in operation by the controller 17. The controller 17 is configured by a microcomputer including a CPU (Central Processing Unit), a ROM (Read Only Memory), and a RAM (Random Access Memory), for example. Such a controller 17 exerts control over the optical disc apparatus 1 in its entirety with a program stored in the memory such as the ROM described above for control and processing, for example.

As an example, the controller 17 issues a command to the servo circuit 12 to move the optical pickup OP at a predetermined address by the slide drive section 6. The controller 17 also issues a control command to the spindle servo circuit 15 about the kick/brake described above.

The controller 17 is provided with a memory 18.

As shown in the drawing, this memory 18 stores a control program 18a, and revising information 18b.

The control program 18a causes the controller 17 to perform processes of FIG. 6 that will be described later.

The revising information 18b will be described later.

(1-2. Relationship Between Search for Optimal Tilt Adjustment Value and Focus Bias)

For a search for an optimal tilt adjustment value in a not-yet-recorded region, a push-pull signal is used as an estimation indicator also in this embodiment similarly to the previous approach. To be specific, an MPP signal is used as the estimation indicator at the time of a search for an optimal tilt adjustment value.

Moreover, there is a concern that the tilt correction may not be performed with good accuracy if the tilt adjustment value found using the MPP signal of the largest amplitude is set with no change for use as described above. Therefore, the tilt adjustment value found using the largest-amplitude MPP signal is revised by information about a difference from a tilt adjustment value found in advance using the best estimation value of the reproduced signal quality.

For revision using the difference information as such, consideration is expected to be given to two focus bias values; one is set at the time of an actual search for an optimal tilt adjustment value in a not-yet-recorded region using the MPP signal, and the other is set when the above-described difference information is obtained. As described above, when these focus bias values are greatly different from each other, the MPP signal shows a change of change characteristics with respect to the tilt correction value (the degree of tilt of the objective lens 3). The search results thus vary.

In the below, the reason thereof is described by referring to FIGS. 2A to 4.

Figure 2A:
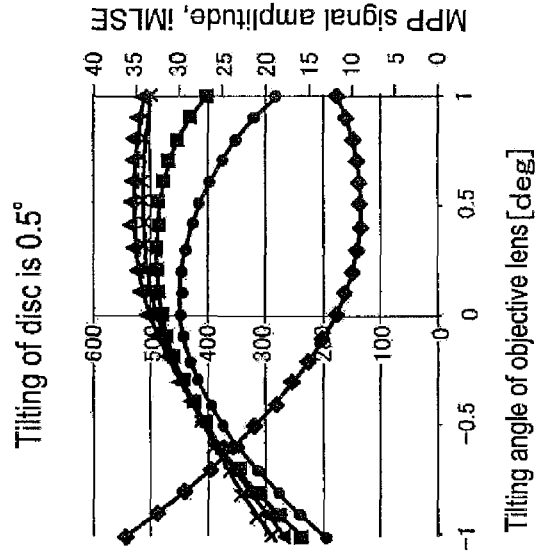
FIGS. 2A and 2B are plots representing the change characteristics of the amplitude of an MPP signal (and the change characteristics of iMLSE) with respect to the tilt angle of an objective lens on the basis of a setting value of focus bias.
Figure 2B:
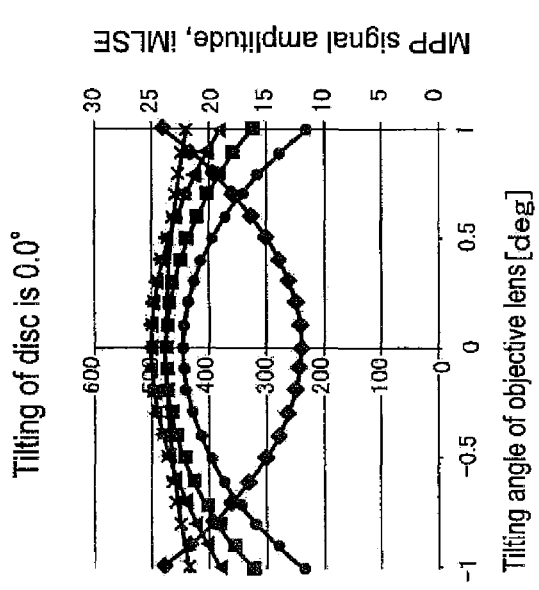

FIGS. 2A and 2B are plots representing the change characteristics of the amplitude of an MPP signal with respect to the tilt angle of an objective lens on the basis of a setting value of focus bias. FIG. 2A shows the change characteristics thereof when the optical disc D is tilted by 0°, i.e., disc tilt=0°, and FIG. 2B shows the change characteristics thereof when the optical disc D is tilted by 0.5°, i.e., disc tilt=0.5°. In FIGS. 2A and 2B, the plot with solid-filled square markers indicates the change characteristics of the amplitude of an MPP signal when the focus bias value=0, the plot with solid-filled triangle markers indicates those when the focus bias value=+3 steps, the plot with x-shaped markers indicates those when the focus bias value=+7 steps, and the plot of solid-filled circular-shaped markers indicates those when the focus bias value=−3 steps.

Also in FIGS. 2A and 2B, the plot with solid-filled rhombus markers indicates the change characteristics of iMLSE with respect to the tilt angle of the objective lens when the focus bias value=0.

FIGS. 3A to 3D are each a contour map representing the change characteristics of the amplitude of an MPP signal and those of iMLSE with respect to the focus bias value and the tilt angle of the objective lens. More specifically, FIG. 3C shows the change characteristics of the amplitude of an MPP signal when the disc tilt=0°, and FIG. 3D shows those when the disc tilt=0.5°. FIG. 3A shows the change characteristics of iMLSE when the disc tilt=0°, and FIG. 3B shows those when the disc tilt=0.5°.

Figure 4:
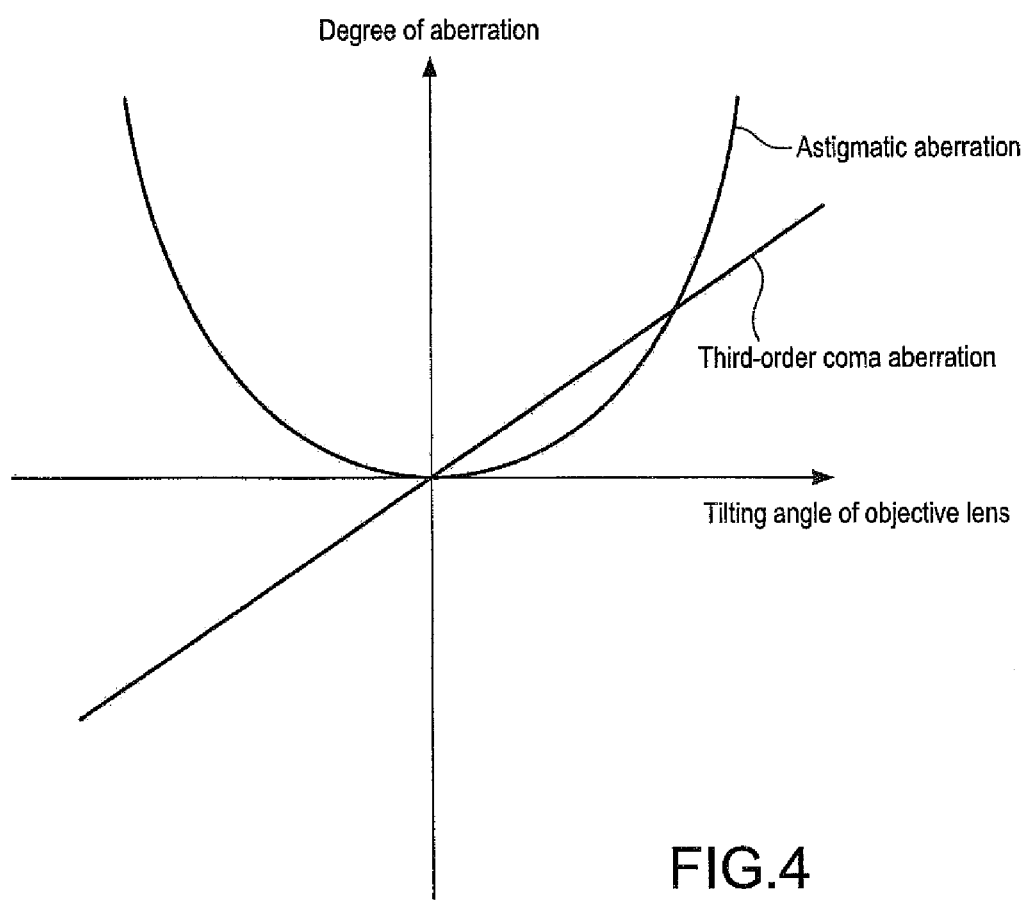
FIG. 4 is a conceptual drawing of the change characteristics of coma aberration and those of astigmatic aberration with respect to the tilt angle of an objective lens.

FIG. 4 is a conceptual drawing of the change characteristics of coma aberration and those of astigmatic aberration with respect to the tilt angle of an objective lens.

Assuming that the disc tilt=0° as a precondition, tilting the objective lens 3 causes not only the coma aberration but also other types of aberration, especially the astigmatic aberration, due to the deviation of the optical axis.

Based on the precondition as such, when the objective lens 3 is tilted in the ideal state with the disc tilt=0° as shown in FIGS. 2A and 3C, not only the coma aberration but also the astigmatic aberration are to be pronounced with increasing tilting degree of the objective lens 3. FIG. 4 conceptually shows how the coma aberration and the astigmatic aberration each become pronounced in such a case.

Because the aberration is to be pronounced with increasing tilting angle of the objective lens 3 as such, when the disc tilt=0°, as shown in FIG. 2A, the change characteristics of the MPP signal amplitude with respect to the tilting angle of the objective lens are in quadric curves, and the vertexes of the curves are all the points where the tilting angle of the objective lens=0°. With the quadric curves as such, when the tilting angle of the objective lens=0°, the amplitude of the MPP signal takes various values depending on a focus bias value to be set. The difference of the amplitude values corresponds to a difference of each focus bias value from the real optimal focus bias value.

On the other hand, when the disc tilt=0.5°, that is, when the disc is tilted as in the actual search for the optimal tilt adjustment value, the coma aberration is to be reduced with increasing tilting degree of the objective lens 3. This means that the MPP signal amplitude is to be accordingly increased.

In the real world, however, tilting the objective lens 3 causes other types of aberration such as the astigmatic aberration. Therefore, when the objective lens 3 is tilted by degrees, the function of reducing the MPP signal amplitude is also produced due to the other types of aberration such as the astigmatic aberration caused as such.

As is known from FIG. 4, the MPP signal amplitude characteristically shows almost a linear increase associated with the reduction of the coma aberration with increasing tilting degree of the objective lens 3, but shows a reduction like a quadric curve as the astigmatic aberration becomes pronounced.

In this case, the focus bias value for setting taking various values means the resulting MPP signal amplitude also taking various values when the tilting angle of the objective lens=0, i.e., when no tilt correction is expected. As is known from this, when the disc tilt=0.5° as shown in FIG. 2B (FIG. 3D), if the focus bias value for setting varies, the resulting tilt adjustment value with which the MPP signal amplitude is maximized also varies. In other words, during the actual search for an optimal tilt adjustment value, if the focus bias value for setting varies, the search result also varies, i.e., the tilting angle of the objective lens with which the MPP signal amplitude is maximized (that is, the optimal tilt adjustment value).

(1-3. Tilt Correction Method as First Embodiment)

In consideration of the issues described above, in this embodiment, the focus bias value to be set for use to obtain the difference information is the one found by the same method as a search/setting method, i.e., method to find a focus bias value for setting at the time of the actual search for an optimal tilt adjustment value in a not-yet-recorded region based on an MPP signal. In other words, the difference information is obtained in advance under the condition of using the focus bias value, which is found by the same method as the search/setting method to find a focus bias value for setting at the time of a search for an optimal tilt adjustment value based on an MPP signal.

Figure 5:
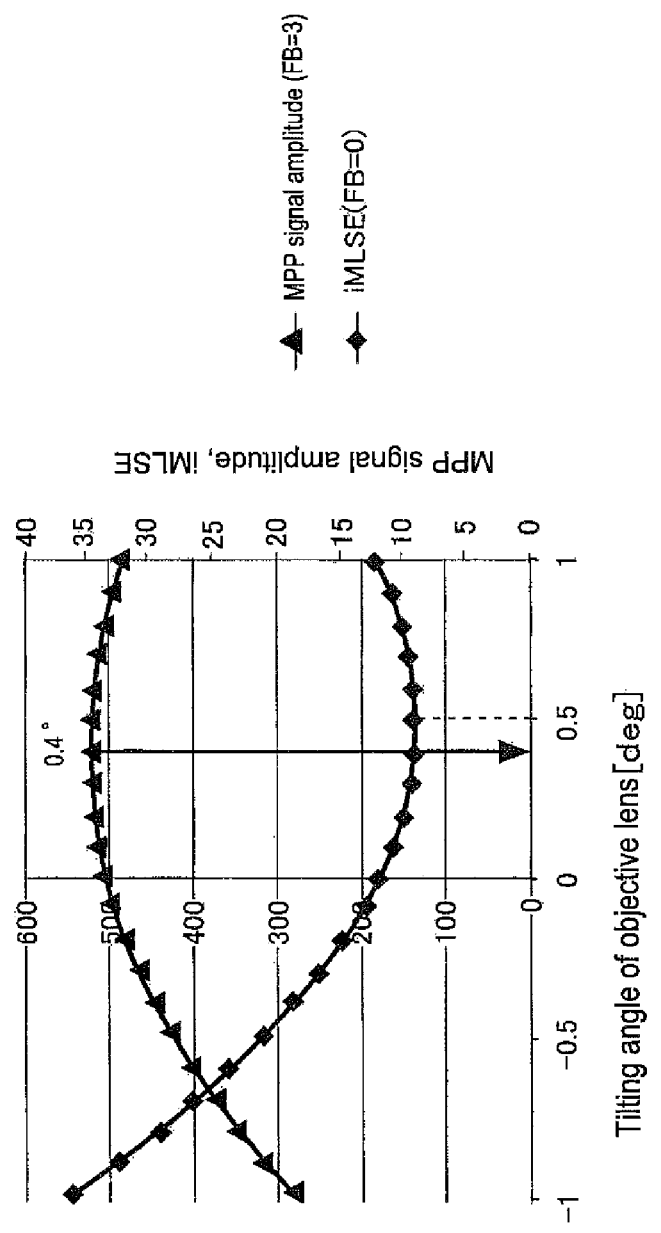
FIG. 5 is a diagram for illustrating a specific example of how to derive difference information.

FIG. 5 is a diagram for illustrating a specific example of how to derive the difference information.

As a precondition, in this embodiment, an MPP signal is used to adjust a focus bias value. To be specific, the focus bias value is adjusted by making a search for a focus bias value with which the MPP signal amplitude is maximized.

In this embodiment, the focus bias value is adjusted at the same time as the adjustment of a spherical aberration correction value. To be specific, the MPP signal amplitude is obtained with various combinations of a focus bias value and a spherical aberration correction value. Thereafter, the combination of the focus bias value and the spherical aberration correction value leading to the largest MPP signal amplitude is regarded as optimal.

Also in the embodiment, the difference information for revision use is not obtained separately by each optical disc apparatus 1 but is obtained in advance by experiments or others, and then is stored in advance in each optical disc apparatus 1.

With the preconditions as such, described now is a specific example of how to derive the difference information.

First of all, obtained is a model value for a focus bias value with which the MPP signal amplitude is maximized, i.e., a model value for each optical disc apparatus 1. To be specific, in this embodiment, the method to find a focus bias value is to find a combination of a focus bias value and a spherical aberration correction value with which the MPP signal amplitude is maximized as described above. As to the optimal focus bias value found by such a search method with which the MPP signal amplitude is maximized, the model value thereof is found in advance by experiments or simulations, for example. Hereinafter, such a model value is referred to as search-found model focus bias value.

Assumed herein is a search found model focus bias value found by experiments or others is +3 steps.

In this embodiment, the MPP signal used as an estimation indicator for finding the optimal values, i.e., the optimal focus bias value and the optimal tilt adjustment value, is assumed to be an MPP signal (traverse signal), which is obtained when the servo circuit 12 is exerting no tracking servo control.

With the search-found model focus bias value found as above, obtained are a tilt adjustment value with which the iMLSE is maximized, and a tilt adjustment value with which the MPP signal amplitude is maximized.

In this case, the disc tilt is assumed to be 0.5° at the time of the search for the optimal tilt adjustment values using the iMLSE and the MPP signal as such. With respect to the disc tilt of 0.5° as such, as shown in FIG. 5, the tilting angle of the objective lens (tilt adjustment value) with which the IMLSE is maximized is assumed to be 0.5°, and the tilting angle of the objective lens (tilt adjustment value) with which the MPP signal amplitude is maximized is assumed to be 0.4°.

The difference information is calculated as information about a ratio between the tilt adjustment values found as such, i.e., the tilt adjustment value with which the iMLSE is maximized, and the tilt adjustment value with which the MPP signal amplitude is maximized. That is, the difference information is the information about a ratio between the tilt adjustment value with which the iMLSE is maximized, and the tilt adjustment value with which the MPP signal amplitude is maximized. These tilt adjustment values are found under the condition of using the focus bias value found by the same method as the search/setting method to find a focus bias value for setting at the time of the actual search for an optimal tilt adjustment value in a not-yet-recorded region based on an MPP signal.

In FIG. 5 example, the difference information being the ratio information is 0.5/0.4. That is, "Tilt Adjustment Value with which iMLSE is maximized/Tilt Adjustment Value with which MPP Signal Amplitude is maximized" is calculated for use as the ratio information as described above.

In the first embodiment, the difference information calculated in advance by experiments or simulations as such is stored in advance in each optical disc apparatus 1 as the revising information 18*b*.

In the optical disc apparatus 1, tilt correction in a not-yet-recorded region is performed by using such revising information 18b. To be specific, the controller 17 goes through a search process to find an optimal tilt adjustment value, i.e., a tilt adjustment value with which the MPP signal amplitude is maximized. With respect to the tilt adjustment value found by the search process as such, the controller 17 multiplies the ratio information stored as the revising information 18b as a coefficient. After the multiplication of the ratio information, the controller 17 notifies the tilt driver 16 of the resulting tilt adjustment value for execution of tilt correction.

With the tilt correction method as the first embodiment described above, the difference information for revision use is obtained using a focus bias value found for setting by the same method as the method to find a focus bias value for setting at the time of the actual search for an optimal tilt adjustment value in a not-yet-recorded region. Therefore, unlike with the previous approach, this accordingly prevents the two focus bias values from being greatly different from each other, i.e., the focus bias value for setting at the time of the search for the tilt adjustment value, and the focus bias value for setting at the time of calculating the difference information.

This thus improves the accuracy of tilt correction to be made in a not-yet-recorded region using an MPP signal better than with the previous approach.

Also in this embodiment, the difference information for revision use is not the difference ΔS as with the previous approach but the ratio information.

The degree of disc tilt varies depending on the radius position of the optical disc D, and the degree difference is increased at the inner periphery/outer periphery. If the tilt adjustment value is revised as with the pervious approach, i.e., revised using the difference ΔS calculated at the inner periphery portion where reproduced signals are obtained, the resulting tilt correction may not be appropriately made at the outer periphery portion where the tilting degree is large.

On the other hand, with this embodiment of using the ratio information, the tilt adjustment value found by the MPP signal amplitude is appropriately revised even if the tilting degree is increased at the outer periphery side, thereby improving the accuracy of tilt correction also in this respect.

Also with this embodiment, the difference information for revision use is calculated in advance, and the resulting value is stored in advance in each optical disc apparatus 1 as the revising information 18b. Therefore, unlike with the previous approach, each optical disc apparatus is not expected to find in advance the difference information any more. To be specific, prior to tilt adjustment using the MPP signal amplitude in a not-yet-recorded region, the previous approach asks for the search process to find the difference information in the inner periphery region where reproduced signals are obtained. However, in this embodiment, such a process is not expected at all so that the time taken for the tilt adjustment in the not-yet-recorded region is favorably reduced.

(1-4. Procedure)

Figure 6:
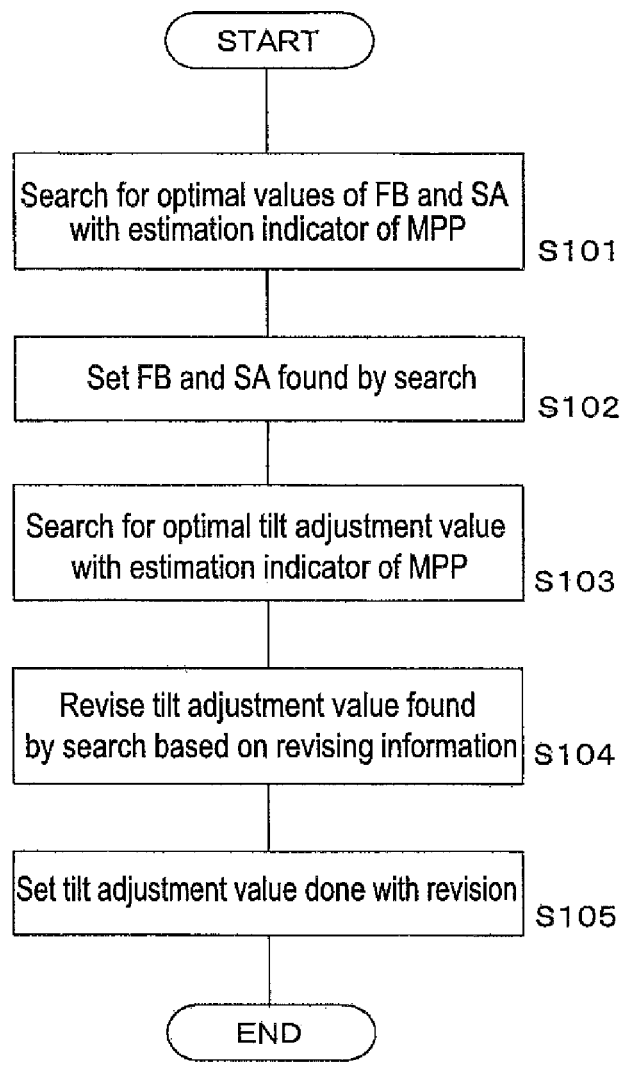
FIG. 6 is a flowchart of specific processes to be performed for implementing a tilt correction method as the first embodiment.

FIG. 6 is a flowchart of specific processes to be performed for implementing the tilt correction method as the first embodiment described above.

The processes of FIG. 6 are performed by the controller 17 based on the control program 18a.

When the processes of FIG. 6 are performed, focus servo by the servo circuit 12 is assumed to be ON.

First of all, in step S101, a search process is performed to find optimal values each for a focus bias value and a spherical aberration correction value using the estimation indicator of an MPP signal.

To be specific, the MPP signal amplitude is obtained with various combinations of a focus bias value and a spherical aberration correction value, which are set one by one in the servo circuit 12 and the SA correction driver 14. Based on the results, the combination of the focus bias value and the spherical aberration correction value leading to the largest MPP signal amplitude is regarded as optimal.

After the search process in step S101, in step S102, a process is performed for setting of the focus bias value and the spherical aberration correction value found by the search. To be specific, the focus bias value and the spherical aberration correction value found by the search are notified respectively to the servo circuit 12 and the SA correction driver 14 for setting.

After the setting process in step S102, in step S103, a process is performed to find an optimal tilt adjustment value using the estimation indicator of an MPP signal. To be specific, various tilt adjustment values are notified one by one to the tilt driver 16, and then the amplitude value of the MPP signal is obtained for each of the tilt adjustment values. The tilt adjustment value with which the MPP signal amplitude is maximized is thus found.

After the search process in step S103, in step S104, the tilt adjustment value found by the search is revised using the revising information 18b. In this embodiment, specifically, the tilt adjustment value found in step S103 is multiplied by a coefficient, which is the revising information 18b being the ratio information described above.

In step S105 subsequent to step S104, a process is performed for setting of the tilt adjustment value done with revision. To be specific, the tilt adjustment value done with revision is notified to the tilt driver 16 for execution of tilt correction in accordance with the tilt adjustment value.

When the process in step S105 is performed, this is the end of the processes of FIG. 6 for the tilt correction.

2. Second Embodiment (2-1. Exemplary Configuration of Optical Disc Apparatus)

Described next is a second embodiment.

The second embodiment adopts a method to offset a focus bias value for a search for an optimal tilt adjustment value in a not-yet-recorded region against an optimal focus bias value by a predetermined value.

Figure 7:
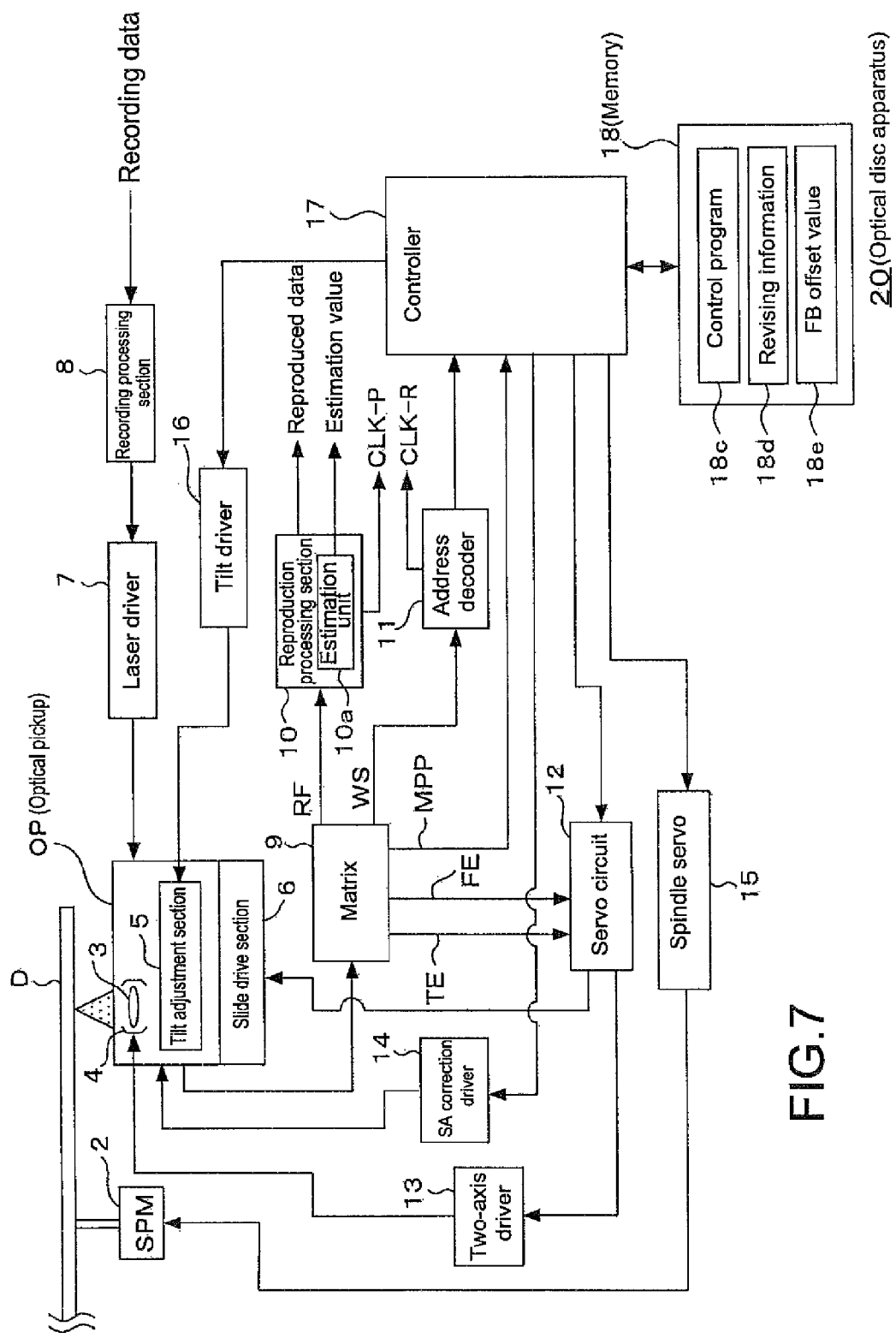
FIG. 7 is a diagram showing the internal configuration of an optical disc apparatus as a second embodiment.

FIG. 7 is a diagram showing the internal configuration of an optical disc apparatus 20 as the second embodiment.

Herein, any component same as that already described in the first embodiment is provided with the same reference numeral, and is not described twice.

As is known in comparison with FIG. 1 referred to in the above, the optical disc apparatus 20 in the second embodiment is different from the optical disc apparatus 1 in the first embodiment in the following respects. That is, the memory 18 stores a control program 18c as an alternative to the control program 18a, and revising information 18d as an alternative to the revising information 18b. The memory 18 as such stores additionally an FB offset value 18e.

The control program 18c causes the controller 17 to perform processes of FIG. 10 that will be described later.

The revising information 18d will be described in detail later with the FB offset value 18e.

(2-2. Tilt Correction Method as Second Embodiment)

As shown in FIGS. 2A to 3D referred to in the above, the MPP signal amplitude shows a change of characteristics with respect to the tilting angle of the objective lens depending on a focus bias value to be set.

By referring to FIGS. 2A and 2B (and FIGS. 3C and 3D), the MPP signal amplitude is known to change differently in terms of degree with respect to the tilting angle of the objective lens depending on a focus bias value to be set. To be specific, the MPP signal amplitude responds differently to the tilting angle of the objective lens, i.e., tilt adjustment value, depending on a focus bias value to be set.

Such a change of response of the MPP signal amplitude depending on the focus bias value is resulted from a change of the relationship between the coma aberration and the astigmatic aberration depending on a focus bias value to be set when the objective lens 3 is tilted, i.e., the relationship between the reduction degree of the coma aberration (increasing degree of the MPP signal amplitude) and the degree of the astigmatic aberration being pronounced (reduction degree of the MPP signal amplitude).

The MPP signal amplitude responds differently as such with the meaning that the focus bias value may be adjusted to take a value of affecting the response of the MPP signal amplitude due to a measurement error or others of the MPP signal amplitude at the time of adjustment of the focus bias value (and the spherical aberration correction value).

If the focus bias value is adjusted to take a value of affecting the response of the MPP signal amplitude, this results in a difficulty in identifying which of the tilt adjustment values leads to the maximum MPP signal amplitude during a search for an optimal tilt adjustment value while changing a tilt adjustment value. As a result, there is a possibility of failing to find the appropriate tilt adjustment value.

In consideration thereof, in the second embodiment, for a search for an optimal tilt adjustment value in a not-yet-recorded region, instead of setting as it is the focus bias value found in advance by the adjustment process (search process) for the focus bias value and the spherical aberration correction value, the focus bias value is offset in the direction of improving the response of the MPP signal amplitude.

At this time, the offset value for provision to the focus bias value done with adjustment is calculated in advance by experiments or simulations, for example.

Figure 8:
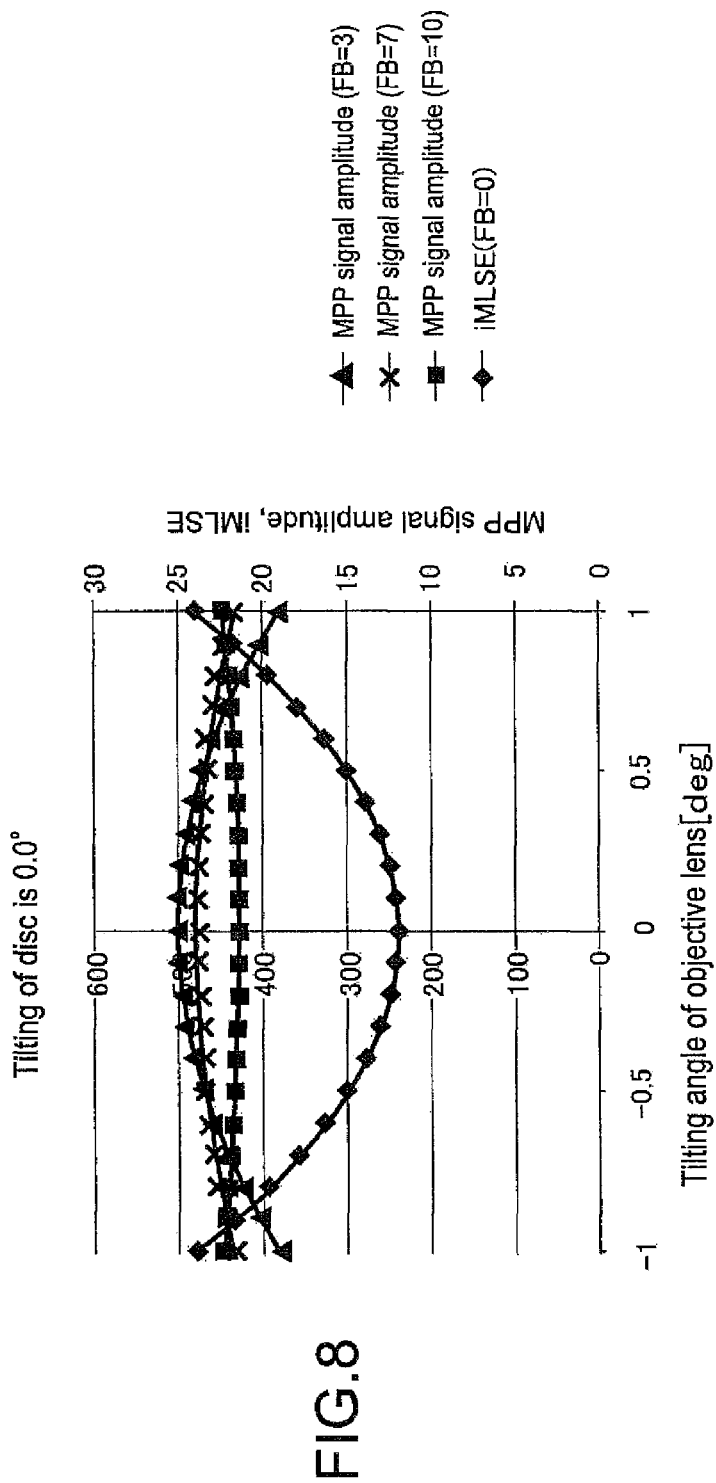
FIG. 8 is a diagram for illustrating a specific method to find an offset value for provision to the focus bias value.

FIG. 8 is a diagram for illustrating a specific method to calculate an offset value for provision to the focus bias value found by the search.

In FIG. 8, the plot with solid-filled triangle markers indicates the change characteristics of the amplitude of an MPP signal with respect to the tilting angle of an objective lens when the focus bias value=+3 steps, the plot with x-shaped markers indicates those when the focus bias value=+7 steps, and the plot with the solid-filled square markers indicates those when the focus bias value=+10 steps. Also in FIG. 8, the plot with solid-filled rhombus markers indicates the change characteristics of iMLSE with respect to the tilting angle of the objective lens (focus bias value=0).

As a precondition, for a search using an MPP signal (when tracking servo is OFF), consideration is expected to be given to a measurement error occurring to the MPP signal amplitude. To be specific, consideration is expected to be given to variation of the focus bias value resulted from the measurement error occurring to the MPP signal amplitude, i.e., variation of the focus bias value found by the search therefor and for a spherical aberration correction value.

Such an adjustment variation in focus bias value is assumed to be generally ±4 steps.

In order to derive an offset value, a model value is calculated in advance by experiments or simulations, for example, for a focus bias value to be found by a search therefor (and for a spherical aberration correction value) using an MPP signal, i.e., the search-found model focus bias value described above. This search-found model focus bias value is assumed to be +3 steps also in this case.

Also to derive an offset value, experiments or simulations are performed in advance to find a focus bias value leading to the lowest response of the MPP signal amplitude with respect to the tilting angle of the objective lens, i.e., the lowest response ensuring the target accuracy for tilt adjustment. Such a focus bias value is hereinafter referred to as accuracy-ensuring focus bias value. For calculating this accuracy-ensuring focus bias value, a measurement error of the MPP signal amplitude is also given into consideration.

Herein, the accuracy-ensuring focus bias value is assumed to be +5 steps as a result of the experiments or others.

The offset value for provision to the focus bias value is expected to satisfy the following condition based on the adjustment variation (adjustment variation in focus bias value), and the focus bias values described above, i.e., the search-found model focus bias value, and the accuracy-ensuring focus bias value.

(Offset Value)<(Accuracy-Ensuring Focus Bias Value)−(Search-Found Model Focus Bias Value)−(Adjustment Variation in Focus Bias Value)

As an example of the value described above, the offset value may be less than −2 steps based on the above inequation of "5−3−4".

In this case, the response of the MPP signal amplitude seems to be affected by degrees with the focus bias value moving to the positive polarity side. Therefore, the value with adjustment variation in focus bias value takes a value on the positive polarity side (+4 steps).

Herein, as to the sign of the focus bias, the direction is defined as appropriate with respect to the physical direction. Moreover, the direction of improving the response of the RF signal quality is not necessarily negative with respect to the tilt.

In consideration thereof, the offset value is defined as to be a value satisfying the condition described above, or the condition as below.

(Offset Value)>(Accuracy-Ensuring Focus Bias Value)+(Search-Found Model Focus Bias Value)+(Adjustment Variation in Focus Bias Value)

In the optical disc apparatus 20 in the second embodiment, the offset value calculated in advance as such is stored as the FB offset value 18e.

In the second embodiment, a focus bias value found by the search process therefor and for a spherical aberration correction value is offset by the FB offset value 18e. Using the resulting focus bias value, a search for an optimal tilt adjustment value in a not-yet-recorded region is performed.

That is, in the second embodiment, a focus bias value is set by the search/setting method different from that in the first embodiment.

Accordingly, in the second embodiment, as the revising information for use to revise the tilt adjustment value with which the MPP signal amplitude is maximized, revising information appropriate to the search/setting method for a focus bias value in the second embodiment as such is calculated in advance. The resulting revising information is stored in the optical disc apparatus 20 as the revising information 18d.

To be specific, the revising information 18d is the one calculated as information about a difference between a tilt adjustment value with which iMLSE is maximized, and a tilt adjustment value with which the MPP signal amplitude is maximized. Such tilt adjustment values are found under the condition of using a focus bias value, which is obtained by offsetting the focus bias value found by the search process therefor and for the spherical aberration correction value using the FB offset value 18e described above. Also in this case, the difference information is calculated as information about a ratio between the tilt adjustment values found as such, i.e., the tilt adjustment value with which iMLSE is maximized, and the tilt adjustment value with which the MPP signal amplitude is maximized.

Just to be sure, the tilt correction method as the second embodiment using the FB offset value 18e and the revising information 18d is described.

Also in this case, similarly to the first embodiment, a focus bias value and a spherical aberration correction value are adjusted (search process) using the estimation indicator of an MPP signal amplitude.

Thereafter, in the second embodiment, the focus bias value as a result of the adjustment is added with the FB offset value 18e. With such a focus bias value, a search is made to find an optimal tilt adjustment value in a not-yet-recorded region.

The tilt adjustment value found by the search using the focus bias value as such is revised using the revising information 18d. The tilt adjustment value done with revision is set to the tilt driver 16 for execution of tilt correction.

With such a tilt correction method as the second embodiment, even if a focus bias value is adjusted to affect the response of the MPP signal amplitude with respect to the tilting angle of the objective lens due to a measurement error occurred to the MPP signal amplitude, the focus bias value is offset to make the MPP signal amplitude respond better with respect to the tilting angle of the objective lens. This accordingly improves the accuracy of tilt correction in a not-yet-recorded region.

(2-3. Procedure)

Figure 9:
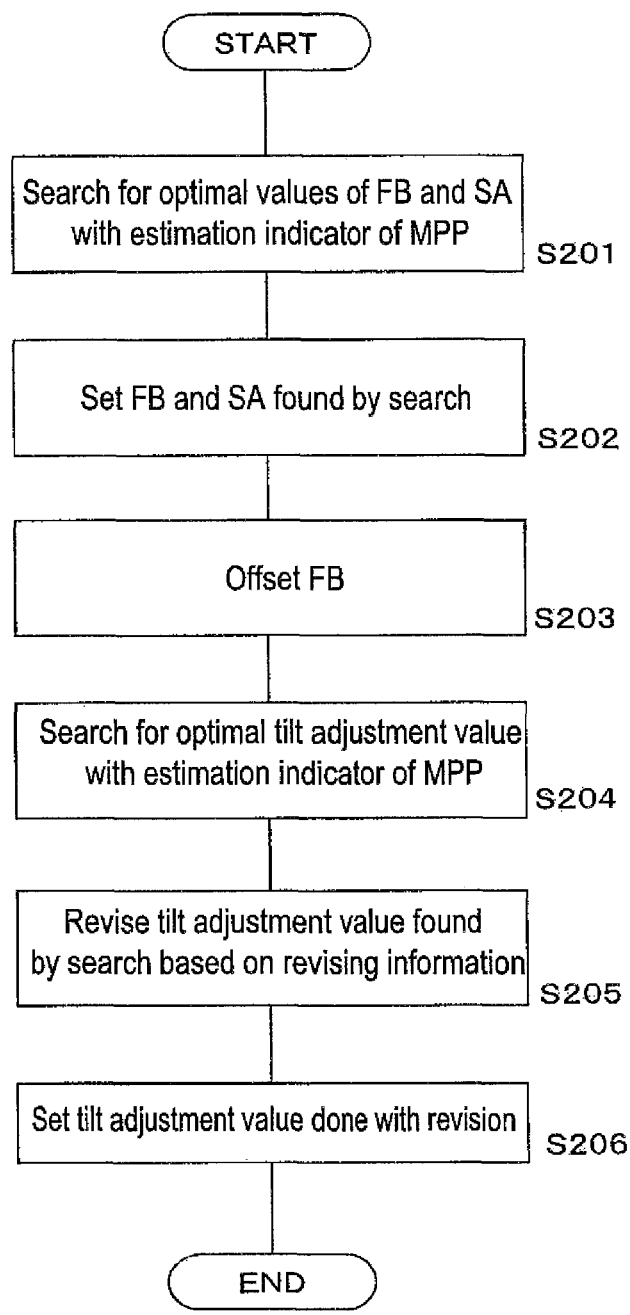
FIG. 9 is a flowchart of specific processes to be performed for implementing a tilt correction method as the second embodiment.

FIG. 9 is a flowchart of specific processes to be performed for implementing the tilt correction method as the second embodiment described above.

The processes of FIG. 9 are performed by the controller 17 of FIG. 7 based on the control program 18c.

Also as to the processes of FIG. 9, when these processes are performed, focus servo by the servo circuit 12 is assumed to be already ON.

In FIG. 9, in step S201, similarly to step S101 of FIG. 6, a search process is performed to find optimal values each for a focus bias value and a spherical aberration correction value using the estimation indicator of an MPP signal.

In step S202 subsequent to step S201, similarly to step S102 of FIG. 6, a process is performed for setting of the focus bias value and the spherical aberration correction value found by the search.

In this case, after the setting process in step S202, in step S203, a process is performed to offset the focus bias value. To be specific, the servo circuit 12 is notified of the FB offset value 18e to add the FB offset value 18e to the focus bias value found and set in steps S201 and S202.

After the offset process in step S203, in step S204, a process is performed to find an optimal tilt adjustment value with the estimation indicator of the MPP signal. This search process in step S204 is performed similarly to the search process in step S103 described above.

After the search process in step S204, in step S205, the tilt adjustment value found by the search is revised based on the revising information 18d. To be specific, in this embodiment, the tilt adjustment value found in step S204 is multiplied by a coefficient, which is the revising information 18d being the ratio information.

In step S206 subsequent to step S205, a process is performed for setting of the tilt adjustment value done with revision. To be specific, the tilt adjustment value done with revision in step S205 is notified to the tilt driver 16 for execution of tilt correction in accordance with the tilt adjustment value.

When the process in step S206 is performed, this is the end of the processes of FIG. 9 for the tilt correction.

3. Modifications

While the present technology has been described, the foregoing description is in all aspects illustrative and not restrictive.

In the description above, exemplified is the case of using the MPP signal amplitude as the estimation indicator for adjustment of a focus bias value and a spherical aberration correction value. Alternatively, a quality estimation value of a reproduced signal may be used as the estimation indicator for the adjustment of a focus bias value and a spherical aberration correction value, e.g., iMLSE is the estimation indicator.

In the below, described is a specific tilt correction method using the estimation indicator of iMLSE for adjustment of a focus bias value and a spherical aberration correction value respectively as modifications of the first and second embodiments.

(3-1. Modification of First Embodiment))

Figure 10:
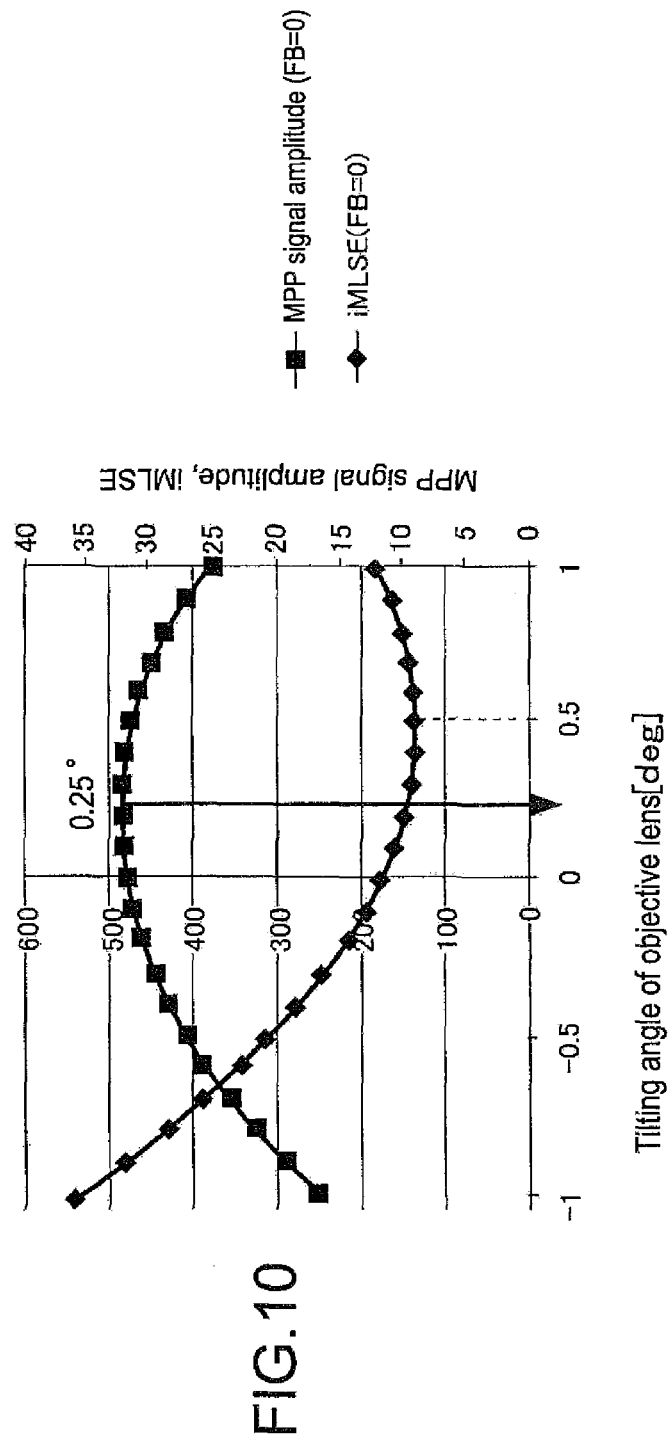
FIG. 10 is a diagram for illustrating how to derive revising information, which is expected to be set when iMLSE is used as an estimation indicator for adjusting the focus bias value/spherical aberration correction value in a case of the first embodiment.

FIG. 10 is a diagram for illustrating how to derive revising information, which is expected to be set when iMLSE is used as an estimation indicator for adjusting the focus bias value and the spherical aberration correction value in a case of the first embodiment.

First of all in this case, for deriving difference information for revision use, a search is made for a model value for a focus bias value with which iMLSE is maximized. To be specific, when the method to find a focus bias value is to find a combination of a focus bias value and a spherical aberration correction value with which iMLSE is maximized, a model value is found in advance by experiments or simulations, for example, for the focus bias value to be found by such a search method with which iMLSE is maximized. Also in this case, the model value is referred to as search-found model focus bias value.

Assumed herein is the search-found model focus bias value found by experiments or others is "0".

With the use of the search-found model focus bias value found with the indicator of iMLSE, obtained are a tilt adjustment value with which iMLSE is maximized and a tilt adjustment value with which the MPP signal amplitude is maximized.

In this case, the disc tilt is assumed to be 0.5° at the time of the search for the optimal tilt adjustment values using the iMLSE and the MPP signal as such. With respect to the disc tilt of 0.5° as such, as shown in FIG. 10, the tilting angle of the objective lens (tilt adjustment value) with which IMLSE is maximized is assumed to be 0.5°, and the tilting angle of the objective lens (tilt adjustment value) with which the MPP signal amplitude is maximized is assumed to be 0.25°.

Also in this case, the difference information for revision use is calculated as information about a ratio between the tilt adjustment values found as such, i.e., the tilt adjustment value with which iMLSE is maximized, and the tilt adjustment value with which the MPP signal amplitude is maximized. To be specific, "Tilt Adjustment Value with which iMLSE is Maximized/Tilt Adjustment Value with which MPP Signal Amplitude is Maximized" is calculated for use as the ratio information.

In FIG. 10 example, the difference information being the ratio information is 0.5/0.25.

The difference information calculated in advance as such is stored in advance in each optical disc apparatus 1 as revising information 18f.

Figure 11:
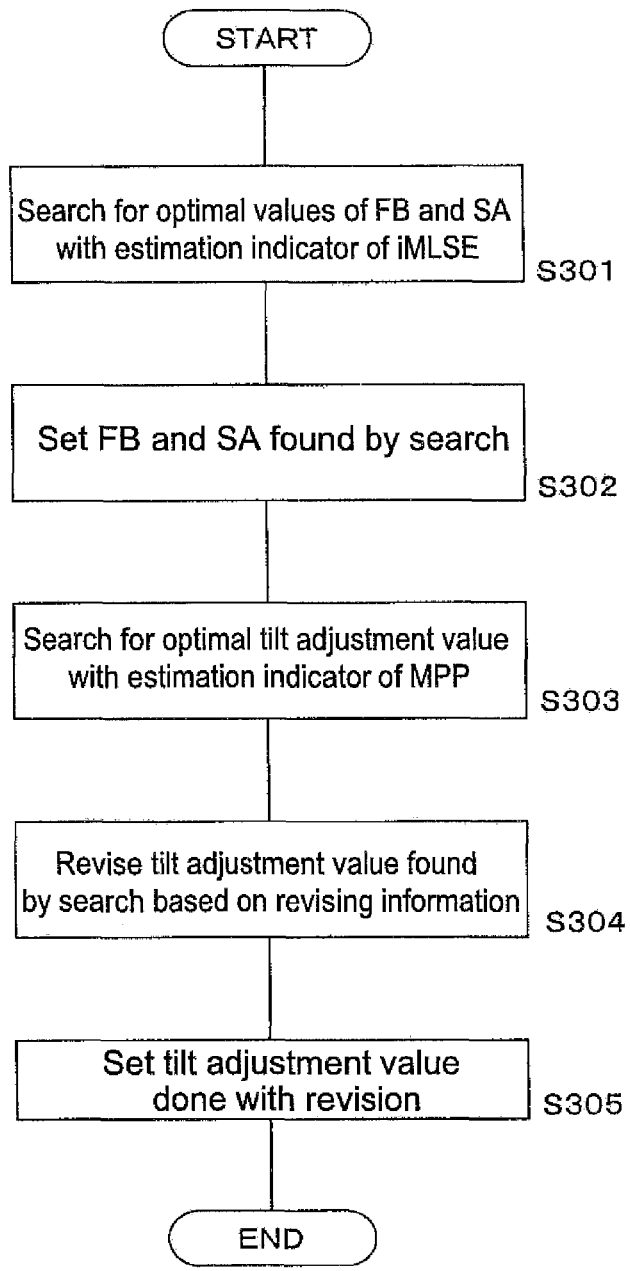
FIG. 11 is a flowchart of specific processes to be performed for implementing a tilt correction method as a modification of the first embodiment.

Just to be sure, the flowchart of FIG. 11 shows the specific processes to be performed for implementing the tilt correction method in this case.

As is known in comparison with FIG. 6 referred to in the above, in this case, as an alternative to the search process for the focus bias value and the spherical aberration correction value in step S101 of FIG. 6, a search process is performed to find optimal values each for a focus bias value and a spherical aberration correction value with the estimation indicator of iMLSE (S301). Processes in steps S302 to S305 thereafter are performed similarly to the processes in steps S102 to S105 except for a process in step S304 of using the revising information 18f described by referring to FIG. 10.

(3-2. Modification of Second Embodiment)

Figure 12:
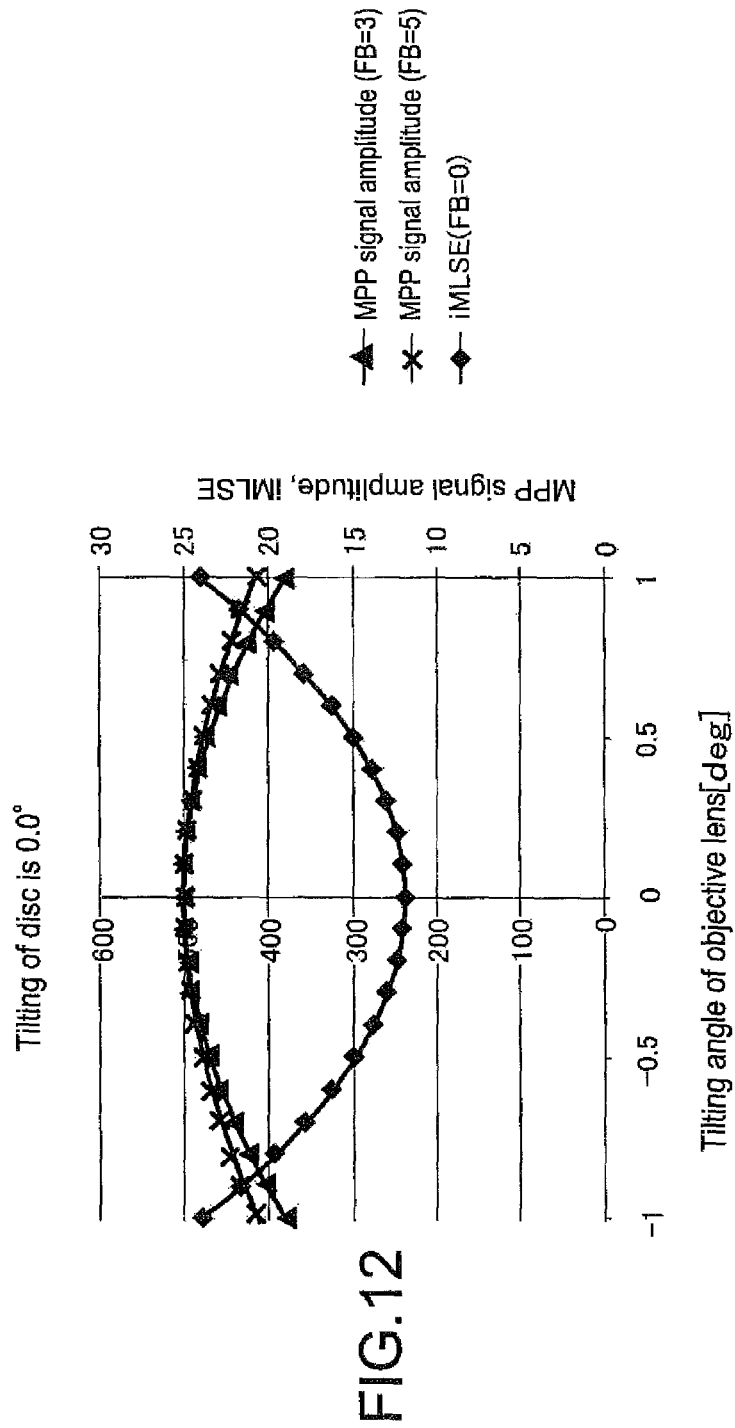
FIG. 12 is a diagram for illustrating how to derive an FB offset value, which is expected to be set when iMLSE is used as an estimation indicator for adjusting the focus bias value/spherical aberration correction value in a case of the second embodiment.

FIG. 12 is a diagram for illustrating how to derive an FB offset value, which is expected to be set when iMLSE is used as an estimation indicator for adjusting the focus bias value and the spherical aberration correction value in a case of the second embodiment.

In FIG. 12, the plot with solid-filled triangle markers indicates the change characteristics of the amplitude of an MPP signal with respect to the tilting angle of an objective lens when the focus bias value=+3 steps, the plot with x-shaped markers indicates those when the focus bias value=+5 steps, and the plot with solid-filled rhombus markers indicates the change characteristics of iMLSE with respect to the tilt angle of the objective lens (focus bias value=0).

First of all, for adjustment of a focus bias value and a spherical aberration correction value with the estimation indicator of iMLSE, adjustment variation, i.e., adjustment variation in focus bias value, is expected to be considered.

Also in this case, to derive an offset value, a model value for a focus bias value to be found by a search therefor (and for a spherical aberration correction value) using the estimation indicator of iMLSE is calculated in advance by experiments or simulations, for example. Also in this case, the model value is referred to as the search-found model focus bias value. This search-found model focus bias value takes a value similar to that in the modification of the first embodiment described above.

Also to derive an offset value, experiments or simulations are performed in advance to find a focus bias value that leads to the minimum level of response expected to the MPP signal amplitude with respect to the tilting angle of the objective lens, i.e., the minimum level of response being able to ensure the target accuracy for tilt adjustment. Such a focus bias value is also referred to as accuracy-ensuring focus bias value. This accuracy-ensuring focus bias value takes a value similar to that in the case of the second embodiment.

In this case, similarly to the case of the second embodiment, the offset value for provision to the focus bias value is defined as to be a value satisfying one of the conditions below based on the adjustment variation, and the focus bias values described above, i.e., the accuracy-ensuring focus bias value, and the search-found model focus bias value, (Offset Value)<(Accuracy-Ensuring Focus Bias Value)−(Search-Found Model Focus Bias Value)−(Adjustment Variation) and (Offset Value)>(Accuracy-Ensuring Focus Bias Value)+ (Search-Found Model Focus Bias Value)+(Adjustment Variation).

In the optical disc apparatus 20 in this case, the offset value calculated in advance as such is stored in the memory 18 as an FB offset value 18g.

The difference information for revision use in this case is calculated in advance as information about a difference between a tilt adjustment value with which iMLSE is maximized, and a tilt adjustment value with which the MPP signal amplitude is maximized. Such tilt adjustment values are found under the condition of using a focus bias value, which is obtained by offsetting, using the FB offset value 18g calculated as such, the focus bias value found by an adjustment process therefor and for a spherical aberration correction value with the estimation indicator of iMLSE. Also in this case, specifically, the difference information is calculated in advance as information about a ratio ("Tilt Adjustment Value with which iMLSE is maximized/Tilt Adjustment Value with which MPP Signal Amplitude is maximized").

In the optical disc apparatus 20 in this case, the difference information calculated in advance as the ratio information is stored in the memory 18 as revising information 18h.

Figure 13:
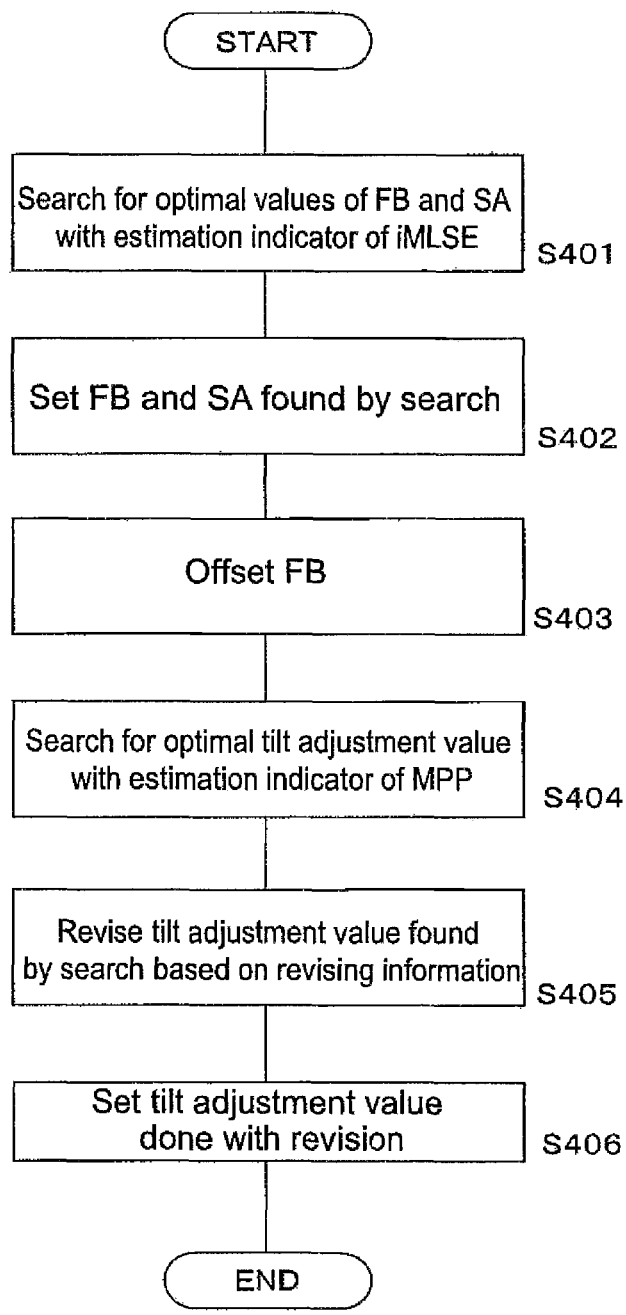
FIG. 13 is a flowchart of specific processes to be performed for implementing a tilt correction method as the second embodiment.

FIG. 13 is a flowchart of specific processes to be performed for implementing a tilt correction method in this case.

As is known in comparison with FIG. 9 referred to in the above, in this case, as an alternative to the search process in step S201 of FIG. 9, a search process is performed to find optimal values each for a focus bias value and a spherical aberration correction value with the estimation indicator of iMLSE (S401).

Processes in steps S402 to S406 thereafter are performed similarly to the processes in steps S202 to S206 except for a process in step S403 of using the FB offset value 18g calculated as above, and a process in step S405 of using the revising information 18h calculated as above.

(3-3. Others)

Exemplified above is the case of using an MPP signal as an estimation indicator for use with a search for an optimal tilt adjustment value in a not-yet-recorded region. The estimation indicator for use with a search for an optimal tilt adjustment value in a not-yet-recorded region is not necessarily restrictive to the MPP signal, and may be a tracking direction error signal. The tracking direction error signal represents an error between light-reception signals, which are obtained by the light reception section in the optical pickup OP performing splitting-light reception in a tracking direction. The estimation indicator may be also a tracking error TE by the DPP, for example.

Alternatively, considering that the disc tilting varies by the radius position of a disc, the tilt correction method according to the embodiments of the present technology may be also performed on the basis of each area divided in the radius direction.

To be specific, in the first embodiment, at least the processes in steps S103 to S105 may be performed on the basis of each predetermined area divided in the radius direction, and in the second embodiment, at least the processes in steps S203 to S206 may be performed on the basis of each predetermined area divided in the radius direction. Herein, the areas divided in the radius direction include inner periphery area/outer periphery area, inner periphery area/central periphery area/outer periphery area, for example.

Moreover, exemplified in the above is the case of using iMLSE as an estimation indicator (signal quality estimation value) based on a reproduced signal (reproduced signal of a signal recorded on the optical disc D), which is used to calculate the difference information as revising information. Alternatively, as such a signal quality estimation value to be generated based on the reproduced signal of a signal recorded on the optical disc, any other types of signal quality estimation values may be also used, i.e., amplitude value of an RF signal.

The present technology is also possibly in the following structures of 1 to 10.

1. An optical disc apparatus, including:
a light irradiation/reception section configured to irradiate an optical disc recording medium with laser light via an objective lens, and to receive return light of the laser light from the optical disc recording medium via the objective lens;
a tilt adjustment section configured to tilt the objective lens;
a focus servo control section configured to exert focus servo control over the objective lens based on a light-reception signal obtained by the light irradiation/reception section receiving the return light;
a focus bias application section configured to apply a focus bias to a focus servo loop formed as a result of the focus servo control by the focus servo control section;
a tracking direction error signal generation section configured to generate, based on the light-reception signals obtained by the light irradiation/reception section performing splitting-light reception in a tracking direction, a tracking direction error signal representing an error between the light-reception signals; and
a control section configured to perform
a tilt adjustment value search process for making a search for, based on the tracking direction error signals as a result of setting various tilt adjustment values to the tilt adjustment section, a tilt adjustment value with which the tracking direction error signal is maximized,
a tilt adjustment value revision process for revising the tilt adjustment value found by the tilt adjustment value search process based on difference information representing a difference between a tilt adjustment value with which a signal quality estimation value is maximized, and the tilt adjustment value with which the tracking direction error signal is maximized, the signal quality estimation value being generated based on a reproduced signal of a signal recorded on the optical disc recording medium, the difference information being calculated in advance under a condition of using a focus bias value found by a search/setting method same as a search/setting method for a focus bias value to be set to the focus bias application section when the tilt adjustment value search process is performed, and
an adjustment control process for causing the tilt adjustment section to perform tilt adjustment based on the tilt adjustment value obtained by the tilt adjustment value revision process.

2. The optical disc apparatus according to 1, in which the difference information is
about a ratio between the tilt adjustment value with which the signal quality estimation value is maximized, and the tilt adjustment value with which the tracking direction error signal is maximized.

3. The optical disc apparatus according to 1 or 2, in which the search/setting method for the focus bias value is for searching for and setting a focus bias value with which the tracking direction error signal is maximized, and
before performing the tilt adjustment value search process, the control section performs a focus bias adjustment process for making a search for the focus bias value with which the tracking direction error signal is maximized, and setting the focus bias value found by the search to the focus bias application section.

4. The optical disc apparatus according to 1 or 2, in which the search/setting method for the focus bias value is for making a search for a focus bias value with which the tracking direction error signal is maximized, and setting a focus bias value obtained by providing a first offset value to the focus bias value found by the search, and
before performing the tilt adjustment value search process, the control section performs a focus bias adjustment process for making a search for the focus bias value with which the tracking direction error signal is maximized, and setting, to the focus bias application section, the focus bias value obtained by providing the first offset value to the focus bias value found by the search.

5. The optical disc apparatus according to 4, in which the first offset value is
calculated to improve a response of the tracking direction error signal against a tilting angle of the objective lens when the first offset value is provided to the focus bias value found by the search/setting method.

6. The optical disc apparatus according to 5, in which the first offset value is calculated to satisfy one of a condition of taking a value smaller than (accuracy-ensuring focus bias value)−(search-found model focus bias value)−(adjustment variation in focus bias value), and a condition of taking a value larger than (accuracy-ensuring focus bias value)+(search-found model focus bias value)+(adjustment variation in focus bias value), where the search-found model focus bias value is a model value for the focus bias value found by the search/setting method with which the tracking direction error signal is maximized,
the adjustment variation in focus bias value is a focus bias value adjustment variation when the focus bias value is found by the search/setting method, and
the accuracy-ensuring focus bias value is a focus bias value to be set to ensure a minimum level of tilt adjustment accuracy being a target by the tilt adjustment value search process.

7. The optical disc apparatus according to 1 or 2, further including
a quality estimation value generation section configured to generate the signal quality estimation value based on the light-reception signal, wherein
the search/setting method for the focus bias value is for searching for and setting a focus bias value with which the signal quality estimation value is maximized, and
before performing the tilt adjustment value search process, the control section performs a focus bias adjustment process for making a search for the focus bias value with which the signal quality estimation value is maximized, and setting the focus bias value found by the search to the focus bias application section.

8. The optical disc apparatus according to 1 or 2, further including
a quality estimation value generation section configured to generate the signal quality estimation value based on the light-reception signal, wherein
the search/setting method for the focus bias value is for making a search for a focus bias value with which the signal quality estimation value is maximized, and setting a focus bias value obtained by providing a second offset value to the focus bias value found by the search, and before performing the tilt adjustment value search process, the control section performs a focus bias adjustment process for making a search for the focus bias value with which the signal quality estimation value is maximized, and setting, to the focus bias application section, the focus bias value obtained by providing the second offset value to the focus bias value found by the search.

9. The optical disc apparatus according to 8, in which the second offset value is calculated to improve a response of the tracking direction error signal against a tilting angle of the objective lens when the second offset value is provided to the focus bias value found by the search/setting method.

10. The optical disc apparatus according to 9, in which the second offset value is calculated to satisfy one of a condition of taking a value smaller than (accuracy-ensuring focus bias value)−(search-found model focus bias value)−(adjustment variation in focus bias value), and a condition of taking a value larger than (accuracy-ensuring focus bias value)+(search-found model focus bias value)+(adjustment variation in focus bias value), where the search-found model focus bias value is a model value for the focus bias value found by the search/setting method with which the signal quality estimation value is maximized, the adjustment variation in focus bias value is a focus bias value adjustment variation when the focus bias value is found by the search/setting method, and the accuracy-ensuring focus bias value is a focus bias value to be set to ensure a minimum level of tilt adjustment accuracy being a target by the tilt adjustment value search process.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus, comprising: a light irradiation/reception section configured to irradiate an optical disc recording medium with laser light via an objective lens, and to receive return light of the laser light from the optical disc recording medium via the objective lens; a tilt adjustment section configured to tilt the objective lens; a focus servo control section configured to exert focus servo control over the objective lens based on a light-reception signal obtained by the light irradiation/reception section receiving the return light; a focus bias application section configured to apply a focus bias to a focus servo loop formed as a result of the focus servo control by the focus servo control section; a tracking direction error signal generation section configured to generate, based on the light-reception signals obtained by the light irradiation/reception section performing splitting-light reception in a tracking direction, a tracking direction error signal representing an error between the light-reception signals; and a control section configured to perform a tilt adjustment value search process for making a search for, based on the tracking direction error signals as a result of setting various tilt adjustment values to the tilt adjustment section, a tilt adjustment value with which the tracking direction error signal is maximized, a tilt adjustment value revision process for revising the tilt adjustment value found by the tilt adjustment value search process based on difference information representing a difference between a tilt adjustment value with which a signal quality estimation value is maximized, and the tilt adjustment value with which the tracking direction error signal is maximized, the signal quality estimation value being generated based on a reproduced signal of a signal recorded on the optical disc recording medium, the difference information being calculated in advance under a condition of using a focus bias value found by a search/setting method same as a search/setting method for a focus bias value to be set to the focus bias application section when the tilt adjustment value search process is performed, and an adjustment control process for causing the tilt adjustment section to perform tilt adjustment based on the tilt adjustment value obtained by the tilt adjustment value revision process, wherein the search/setting method for the focus bias value is for making a search for a focus bias value with which the tracking direction error signal is maximized, and setting a focus bias value obtained by providing a first offset value to the focus bias value found by the search, and before performing the tilt adjustment value search process, the control section performs a focus bias adjustment process for making a search for the focus bias value with which the tracking direction error signal is maximized, and setting, to the focus bias application section, the focus bias value obtained by providing the first offset value to the focus bias value found by the search.

2. The optical disc apparatus according to claim 1, wherein the difference information is about a ratio between the tilt adjustment value with which the signal quality estimation value is maximized, and the tilt adjustment value with which the tracking direction error signal is maximized.

3. The optical disc apparatus according to claim 1, wherein the first offset value is calculated to improve a response of the tracking direction error signal against a tilting angle of the objective lens when the first offset value is provided to the focus bias value found by the search/setting method.

4. The optical disc apparatus according to claim 3, wherein the first offset value is calculated to satisfy one of a condition of taking a value smaller than (accuracy-ensuring focus bias value)−(search-found model focus bias value)−(adjustment variation in focus bias value), and a condition of taking a value larger than (accuracy-ensuring focus bias value)+(search-found model focus bias value)+(adjustment variation in focus bias value), where the search-found model focus bias value is a model value for the focus bias value found by the search/setting method with which the tracking direction error signal is maximized, the adjustment variation in focus bias value is a focus bias value adjustment variation when the focus bias value is found by the search/setting method, and the accuracy-ensuring focus bias value is a focus bias value to be set to ensure a minimum level of tilt adjustment accuracy being a target by the tilt adjustment value search process.

5. The optical disc apparatus according to claim 1, further comprising a quality estimation value generation section configured to generate the signal quality estimation value based on the light-reception signal.

6. An optical disc apparatus, comprising:

a light irradiation/reception section configured to irradiate an optical disc recording medium with laser light via an objective lens, and to receive return light of the laser light from the optical disc recording medium via the objective lens;

a tilt adjustment section configured to tilt the objective lens;

a focus servo control section configured to exert focus servo control over the objective lens based on a light-reception signal obtained by the light irradiation/reception section receiving the return light;

a focus bias application section configured to apply a focus bias to a focus servo loop formed as a result of the focus servo control by the focus servo control section;

a tracking direction error signal generation section configured to generate, based on the light-reception signals obtained by the light irradiation/reception section performing splitting-light reception in a tracking direction, a tracking direction error signal representing an error between the light-reception signals;

a control section configured to perform a tilt adjustment value search process for making a search for, based on the tracking direction error signals as a result of setting various tilt adjustment values to the tilt adjustment section, a tilt adjustment value with which the tracking direction error signal is maximized, a tilt adjustment value revision process for revising the tilt adjustment value found by the tilt adjustment value search process based on difference information representing a difference between a tilt adjustment value with which a signal quality estimation value is maximized, and the tilt adjustment value with which the tracking direction error signal is maximized, the signal quality estimation value being generated based on a reproduced signal of a signal recorded on the optical disc recording medium, the difference information being calculated in advance under a condition of using a focus bias value found by a search/setting method same as a search/setting method for a focus bias value to be set to the focus bias application section when the tilt adjustment value search process is performed, and an adjustment control process for causing the tilt adjustment section to perform tilt adjustment based on the tilt adjustment value obtained by the tilt adjustment value revision process; and a quality estimation value generation section configured to generate the signal quality estimation value based on the light-reception signal, wherein the search/setting method for the focus bias value is for making a search for a focus bias value with which the signal quality estimation value is maximized, and setting a focus bias value obtained by providing a second offset value to the focus bias value found by the search, and before performing the tilt adjustment value search process, the control section performs a focus bias adjustment process for making a search for the focus bias value with which the signal quality estimation value is maximized, and setting, to the focus bias application section, the focus bias value obtained by providing the second offset value to the focus bias value found by the search.

7. The optical disc apparatus according to claim 6, wherein the second offset value is calculated to improve a response of the tracking direction error signal against a tilting angle of the objective lens when the second offset value is provided to the focus bias value found by the search/setting method.

8. The optical disc apparatus according to claim 7, wherein the second offset value is calculated to satisfy one of a condition of taking a value smaller than (accuracy-ensuring focus bias value)−(search-found model focus bias value)−(adjustment variation in focus bias value), and a condition of taking a value larger than (accuracy-ensuring focus bias value)+(search-found model focus bias value)+(adjustment variation in focus bias value), where the search-found model focus bias value is a model value for the focus bias value found by the search/setting method with which the signal quality estimation value is maximized, the adjustment variation in focus bias value is a focus bias value adjustment variation when the focus bias value is found by the search/setting method, and the accuracy-ensuring focus bias value is a focus bias value to be set to ensure a minimum level of tilt adjustment accuracy being a target by the tilt adjustment value search process.

9. A tilt correction method in an optical disc apparatus configured to be able to irradiate an optical disc recording medium with laser light via an objective lens and receive return light of the laser light, and to be able to adjust a focus bias, the method comprising:

searching for, based on a tracking direction error signal obtained by tilting the objective lens at various angles with a setting of various tilt adjustment values, the tracking direction error signal representing an error between light-reception signals obtained by splitting-light reception in a tracking direction, a tilt adjustment value with which the tracking direction error signal is maximized, revising the tilt adjustment value found by the searching based on difference information representing a difference between a tilt adjustment value with which a signal quality estimation value is maximized, and the tilt adjustment value with which the tracking direction error signal is maximized, the signal quality estimation value being generated based on a reproduced signal of a signal recorded on the optical disc recording medium, the difference information being calculated in advance under a condition of using a focus bias value found by a search/setting method same as a search/setting method for a focus bias value to be set when the searching is performed, and controlling execution of tilt adjustment by a tilt of the objective lens based on the tilt adjustment value obtained by the revising, wherein the search/setting method for the focus bias value is for making a search for a focus bias value with which the tracking direction error signal is maximized, and setting a focus bias value obtained by providing a first offset value to the focus bias value found by the search, and before performing the tilt adjustment value search process, performing a focus bias adjustment process for making a search for the focus bias value with which the tracking direction error signal is maximized, and setting the focus bias value obtained by providing the first offset value to the focus bias value found by the search.

10. A non-transitory computer readable memory having stored thereon a program causing, when executed by an optical disc apparatus configured to be able to irradiate an optical disc recording medium with laser light via an objective lens and receive return light of the laser light, and to be able to adjust a focus bias, the optical disc apparatus:

to search for, based on a tracking direction error signal obtained by tilting the objective lens at various angles with a setting of various tilt adjustment values, the tracking direction error signal representing an error between light-reception signals obtained by splitting-light reception in a tracking direction, a tilt adjustment value with which the tracking direction error signal is maximized, to revise the tilt adjustment value found by the searching based on difference information representing a difference between a tilt adjustment value with which a signal quality estimation value is maximized, and the tilt adjustment value with which the tracking direction error signal is maximized, the signal quality estimation value being generated based on a reproduced signal of a signal recorded on the optical disc recording medium, the difference information being calculated in advance under a condition of using a focus bias value found by a search/setting method same as a search/setting method for a focus bias value to be set when the searching is performed, and to control execution of tilt adjustment by a tilt of the objective lens based on the tilt adjustment value obtained by the revising, wherein the search/setting method for the focus bias value is for making a search for a focus bias value with which the tracking direction error signal is maximized, and setting a focus bias value obtained by providing a first offset value to the focus bias value found by the search, and before performing the tilt adjustment value search process, performing a focus bias adjustment process for making a search for the focus bias value with which the tracking direction error signal is maximized, and setting the focus bias value obtained by providing the first offset value to the focus bias value found by the search.

* * * * *